H. E. THEISEN.
GAS WASHING APPARATUS.
APPLICATION FILED SEPT. 26, 1912.
1,052,188.
Patented Feb. 4, 1913.
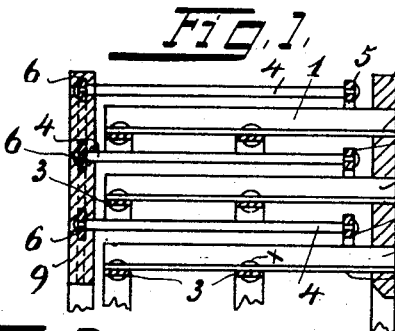
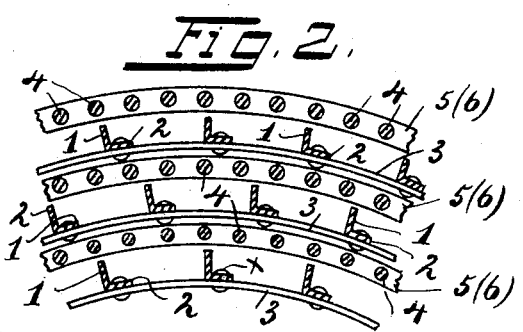
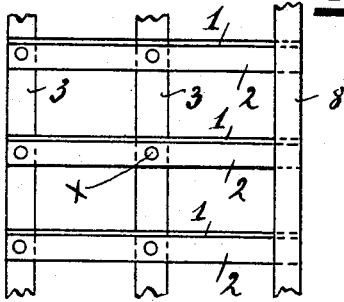
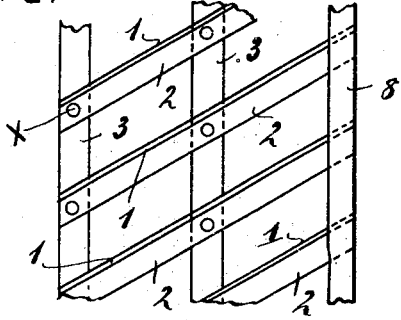
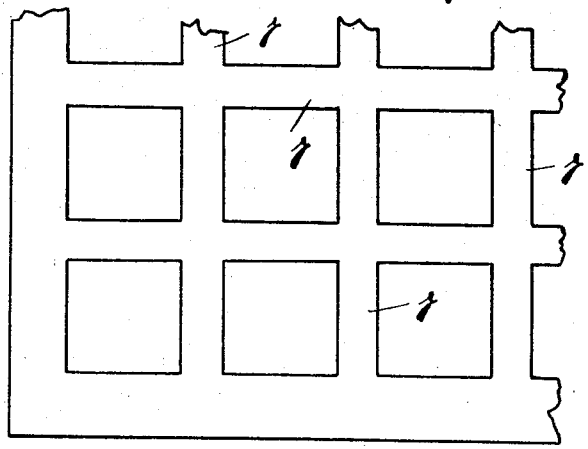

UNITED STATES PATENT OFFICE.

HANS ED. THEISEN, OF MUNICH, GERMANY.

GAS-WASHING APPARATUS.

1,052,188. Specification of Letters Patent. Patented Feb. 4, 1913.

Application filed September 26, 1912. Serial No. 722,400.

*To all whom it may concern:*

Be it known that I, HANS EDUARD THEISEN, a citizen of the United States of America, residing at Munich, Germany, have invented certain new and useful Improvements in Gas-Washing Apparatus, of which the following is a specification.

The present invention relates generally to gas washing apparatus, and has especial reference to the form, arrangement, and combination of the fixed and rotary disintegrator members employed in such apparatus.

One of the principal objects of the invention is to improve the form and construction of the rotary disintegrator members, whereby the effectiveness of the washing action will be materially increased over the means now employed for this purpose.

Another object is to provide a novel form and arrangement of fixed disintegrator members for use in gas washing apparatus.

A further object of the invention is to so combine the rotary and fixed disintegrator members that while the entire device may be cheaply, quickly, and simply constructed, its operation will be thoroughly efficient and easily controlled.

Other objects and advantages of the invention, and its detail structure will be clearly disclosed in the following specification, reference being made to the accompanying drawing, wherein, Figure 1 is a transverse sectional view of a fragment of a gas washing machine embodying my invention; Fig. 2 is a longitudinal sectional view thereof; Fig. 3 is an elevational view of a fragment of one of the rotary disintegrator members; Fig. 4 is a similar view of a somewhat modified form of rotary disintegrator; Fig. 5 is a cross sectional view, and Fig. 6 a plan view of a modified form of fixed disintegrator member.

In carrying my invention into practice, I aim to provide a fixed disintegrator member which shall be so formed as to present a plurality of suitable impact surfaces for the gas to be cleansed, and a rotary member which shall have suitable projections acting in the nature of centrifugal wings or blades by means of which the gas is hurled or forced against the impact surfaces. These impact surfaces, as well as the projections on the rotary member, may be formed in any of several ways, and I will now proceed to describe, by aid of the drawing, the forms of invention which I consider, at present, to be preferable for the purpose.

Referring to Figs. 1 and 4, the rotary disintegrators are formed of angle irons 1, 2, braced and interconnected by flat metal rings 3. The arms 1 of the angle irons are directed radially outward from the main shaft (not shown), while the arms 2 are substantially tangential to the rings 3. These angle irons may be arranged parallel to the main shaft as shown in Figs. 1 to 3, or diagonally thereto as indicated in Fig. 4. The angle irons, which are secured to the rings 3 by bolts $x$ or the like, operate during rotation in the nature of centrifugal blades throughout their entire extent, so that the centrifugal action is an extremely efficient one, particularly in view of the fact that the extent to which the arms 1 project may be made as great as desired. The structure is extremely rigid and may be simply and cheaply produced. The fixed disintegrator member is designed to present a plurality of impact surfaces, as above stated, and in the form of invention shown in Figs. 1 and 2, these impact surfaces are formed by a series of rods or bars 4 interconnected at their inner ends and braced by flat metal rings 5 and 6. It will be understood that the angle irons alternate with the rods or bars and rotate between adjacent rods or bars as clearly disclosed by Figs. 1 and 2.

In lieu of forming the fixed disintegrators of the separate bars or rods 4, they may be formed, as shown in Figs. 5 and 6, by stamping a sheet of boiler tin so as to leave the strong, substantial, integral bars or connecting webs 7, which act in the same manner as the bars or rods 4 of the form illustrated in Figs. 1 and 2. Both rotating and fixed disintegrators are preferably removably carried by cast metal heads 8 and 9.

While I have herein described my invention in considerable detail, it will be obvious to those skilled in the art that considerable modification of structure, within the scope of the appended claims, is possible. I may, if desired, form the equivalent of the angle irons 1, 2, by stamping up out of a solid metal sheet projections which extend radially outward in the same manner as the projections 1 of the drawing, and have the intact part of the sheet serve the same purpose and perform the same function as the elements 2, 3 and $x$. Again, in lieu of forming the bars or rods 4 round, as shown in Figs. 1 and 2, they may be rectangular as shown in Figs. 5 and 6. It will also be apparent that numerous combinations of fixed and rotary disintegrators may be made, all of which it has not been deemed necessary to illustrate or describe.

I claim:—

1. A gas washing apparatus embodying therein a rotary disintegrator member having a latticed periphery composed of supporting rings and spaced circumferential strips in combination with radial strips connected thereto and extending from the periphery.

2. A gas washing apparatus embodying therein a rotary disintegrator member comprising angle irons, and flat metal rings interconnecting and bracing said angle irons.

3. In a gas washing apparatus, the combination with a fixed disintegrator member having a plurality of impact surfaces, of a rotary disintegrator member having a plurality of interconnected angle irons adapted to rotate between said impact surfaces.

4. In a gas washing apparatus, the combination with a fixed disintegrator member having a series of rods or bars presenting impact surfaces, of a rotary disintegrator member having a plurality of angle irons, and flat metal rings interconnecting and bracing said angle irons.

In testimony whereof I have affixed my signature in presence of two witnesses.

HANS ED. THEISEN.

Witnesses:
MATHILDE K. HELD,
RICHARD LEMP.